United States Patent [19]

Schietinger et al.

[11] Patent Number: 5,318,362

[45] Date of Patent: Jun. 7, 1994

[54] NON-CONTACT TECHNIQUES FOR MEASURING TEMPERATURE OF RADIATION-HEATED OBJECTS

[75] Inventors: Charles W. Schietinger; Bruce E. Adams, both of Portland, Oreg.

[73] Assignee: Luxtron Corporation, Santa Clara, Calif.

[21] Appl. No.: 943,927

[22] Filed: Sep. 11, 1992

Related U.S. Application Data

[63] Continuation of Ser. No. 507,605, Apr. 10, 1990, Pat. No. 5,154,512.

[51] Int. Cl.$^5$ .............................. G01J 5/08; G01J 5/28
[52] U.S. Cl. .................. 374/142; 250/227.14; 356/43; 374/9; 374/128; 374/130
[58] Field of Search ............... 374/9, 131, 130, 133; 356/48, 44, 46, 43; 219/405, 492.1, 504; 73/865.9

[56] References Cited

U.S. PATENT DOCUMENTS

| | | |
|---|---|---|
| 2,709,367 | 5/1955 | Bohnet . |
| 3,288,625 | 11/1966 | Kauer . |
| 3,586,940 | 6/1971 | Rudolph . |
| 3,686,940 | 8/1972 | Kockott . |
| 3,971,939 | 7/1976 | Andressen . |
| 4,101,759 | 7/1978 | Anthony et al. . |
| 4,222,663 | 9/1980 | Gebhart et al. . |
| 4,236,075 | 11/1980 | Nexo et al. . |
| 4,254,455 | 3/1981 | Neal, Jr. . |
| 4,408,827 | 10/1983 | Guthrie et al. . |
| 4,417,822 | 11/1983 | Stein et al. . |
| 4,513,384 | 4/1985 | Rosencwaig ............... 374/4 X |
| 4,540,293 | 9/1985 | Shores . |
| 4,557,607 | 12/1985 | Busse ....................... 374/121 |
| 4,576,486 | 3/1986 | Dils . |
| 4,579,461 | 4/1986 | Rudolph . |
| 4,579,463 | 4/1986 | Rosencwaig et al. . |
| 4,632,908 | 12/1986 | Schultz . |
| 4,647,774 | 3/1987 | Brisk et al. . |
| 4,647,775 | 3/1987 | Stein . |
| 4,708,493 | 11/1987 | Stein . |
| 4,745,291 | 5/1988 | Niiya ....................... 250/560 |
| 4,750,139 | 6/1988 | Dils . |
| 4,752,127 | 6/1988 | Zafred . |
| 4,799,787 | 1/1989 | Mason . |
| 4,850,661 | 7/1989 | Kawakatsu . |
| 4,865,405 | 9/1989 | Kageyama . |
| 4,919,542 | 4/1990 | Nulman ..................... 374/128 |

(List continued on next page.)

FOREIGN PATENT DOCUMENTS

| | | |
|---|---|---|
| 0208067 | 1/1987 | European Pat. Off. . |
| 0380412 | 8/1990 | European Pat. Off. . |
| 57-30916 | 2/1982 | Japan . |
| 0118069 | 5/1990 | Japan . |

OTHER PUBLICATIONS

Patent Abstracts Japan, vol. 6, No. 129, Jul. 15, 1982 and JP 57-054,802 Apr. 1, 1982.
Patent Abstracts Japan, vol. 8, No. 113, May 26, 1984

(List continued on next page.)

*Primary Examiner*—Daniel M. Yasich
*Attorney, Agent, or Firm*—Majestic, Parsons, Siebert & Hsue

[57] ABSTRACT

A non-contact pyrometric technique is provided for measuring the temperature and/or emissivity of an object that is being heated by electromagnetic radiation within the optical range. The measurement is made at short wavelengths for the best results. The measurement may be made at wavelengths within those of the heating optical radiation, and the resulting potential error from detecting heating radiation reflected from the object is avoided by one of two specific techniques. A first technique utilizes a mirror positioned between the heating lamps and the object, the mirror reflecting a narrow wavelength band of radiation in which the optical pyrometer detector operates. The second technique is to independently measure the a.c. ripple of the heating lamp radiation and subtract the background optical noise from the detected object signal in order to determine temperature and emissivity of the object. Both of these techniques can be combined, if desired.

31 Claims, 3 Drawing Sheets

U.S. PATENT DOCUMENTS

| | | |
|---|---|---|
| 4,979,134 | 12/1990 | Arima et al. . |
| 4,983,001 | 1/1991 | Hagiuda et al. . |
| 4,986,928 | 1/1990 | Perilloux et al. . |
| 4,989,970 | 2/1991 | Campbell et al. . |
| 5,048,960 | 9/1991 | Hayashi et al. . |
| 5,154,512 | 10/1992 | Schietinger et al. . |
| 5,166,080 | 11/1992 | Schietinger et al. . |
| 5,180,226 | 1/1993 | Moslehi . |
| 5,231,595 | 7/1993 | Makino et al. . |

OTHER PUBLICATIONS and JP 59-020,804 Feb. 2, 1984.

Pettibone et al., "The Effect of Thin Dielectric Films on the Accuracy of Pyrometric Temperature Measurement," *Materials Research Society Symposium Proceedings*, vol. 52, pp. 209–216, 1986.

Accufiber, "New Ways to Improve RPT Through Optical Fiber Thermometry," *Application Note*, 16 pages, Jul. 28, 1989.

Stultz, "Rapid Thermal Processing: Equipment Issues for High Volume Production Environments," Peak Systems, Inc., Fremont, Calif., no known date, 4 pages.

Gelpey et al., "Process Control for a Rapid Optical Annealing System," *Mat. Res. Soc. Symp. Proc.*, 1985, pp. 199–207, 9 pages.

Kato et al., "Rapid Annealing Using Halogen Lamps," *J. Electrochem. Soc.*, Solid State Science and Technology, vol. 131, No. 5, May 1984, pp. 1145–1152.

Singer, "Will RTP Emerge as the Cinderella Technology of the 90s?", *Semiconductor International*, Mar. 1989, pp. 76–80.

Accufiber, "New Ways to Improve RTP Through Optical Fiber Thermometry," dated Apr. 11, 1989, six pages.

NON-CONTACT TECHNIQUES FOR MEASURING TEMPERATURE OF RADIATION-HEATED OBJECTS

This is a continuation of application Ser. No. 07/507,605, filed Apr. 10, 1990, now U.S. Pat. No. 5,154,512 (issued Oct. 13, 1992).

BACKGROUND OF THE INVENTION

This invention is related generally to temperature and emissivity measurement, and more specifically, to the measurement by pyrometric techniques of high processing temperatures of objects heated by electromagnetic radiation within the visible, infrared or other near-visible wavelength range.

There are many examples of the application of optical heating techniques. One example is in heating materials for the purpose of testing them. Another is in the heat treatment of an object. A further example of is found in the semiconductor processing industry. In this latter example, silicon wafers to be processed are positioned within an enclosed chamber made, at least partially, of an optically transparent material. Lamps outside the chamber direct a large amount of energy through its transparent walls and onto the wafer. The wafer is heated as a result of its absorption of the optical radiation. Generally, the chamber is formed of a quartz envelope, or of stainless steel with an optical window. The heated wafer is treated by introducing appropriate gases into the chamber which react with the heated surface of the wafer.

These processes require that the temperature of the wafer be maintained within narrow limits in order to obtain good processing results. Therefore, some technique of monitoring the temperature of the wafer is required. One possibility is to contact the wafer with a conventional thermocouple, but this is precluded by poor measurement and contamination considerations when semiconductor wafers are the objects being heated. For other types of objects, such contact measurement techniques most often are precluded because of a number of practical considerations. The technique also often results in substantial errors because of a differing thermal mass, poor thermal contact and a difference in emittance between the thermocouple and the object being heated.

As a result, most optical heating applications use some form of a long wavelength pyrometer. This technique measures the intensity of the radiation of the semiconductor wafer or other optically heated object within a narrow wavelength band. That radiation intensity is then correlated with temperature of the object. In order to avoid errors by the pyrometer receiving heating optical radiation reflected from the object being heated, the wavelength chosen for monitoring by the pyrometer is outside of the emission spectrum of heating lamps. This detected wavelength range is generally made to be significantly longer than the spectrum of the lamps.

There are several disadvantages to such existing pyrometric systems. First, a measurement made at a longer wavelength will have only a portion of the sensitivity of one made at a shorter wavelength. Second, the emissivity of silicon and other materials that are optically heated is dependent upon the wavelength at which it is measured. Third, the photodetectors with the highest signal-to-noise ratio are those which respond to the shorter wavelength emissions. Fourth, existing optical pyrometers have a small numerical aperture and thus provide temperature measurements which are also dependent upon the degree of roughness of the object and film growth being measured. Fifth, existing pyrometric techniques are slow, a significant disadvantage in a rapid heating system.

It is a primary object of the present invention to provide an improved pyrometric technique of temperature and/or emissivity measurements that overcomes these shortcomings.

SUMMARY OF THE INVENTION

This and additional objects are achieved by the present invention which allows measurement of object temperature and/or emissivity by monitoring its radiation emission at short wavelengths, even if in a bandwidth that is coincident with that of the strong optical radiation source that is heating the object. According to one aspect of the present invention, this is accomplished by positioning a mirror between the lamps and the object that reflects back toward the lamps a narrow wavelength band, thereby eliminating this band of light from the chamber. A lightpipe then collects only the object's emission light within this reflected band. According to a second aspect of the present invention, the optical radiation of the alternating current driven heating lamps is monitored simultaneously with monitoring the light from the object in order to develop a measured value proportional to the light being reflected by the object, thereby allowing the object-reflected light to be subtracted from the total signal. Either case overcomes the natural effect of the heating light source to overwhelm the temperature signal being obtained by monitoring object emissions within the wavelengths of the heating lamps. These two aspects of the invention can be utilized separately or together.

Additional objects, advantages and features of the present invention will become apparent from the following description of its preferred embodiments, which description should be taken in conjunction with the accompanying drawings.

DESCRIPTION OF THE PREFERRED EMBODIMENTS

Figure 1:
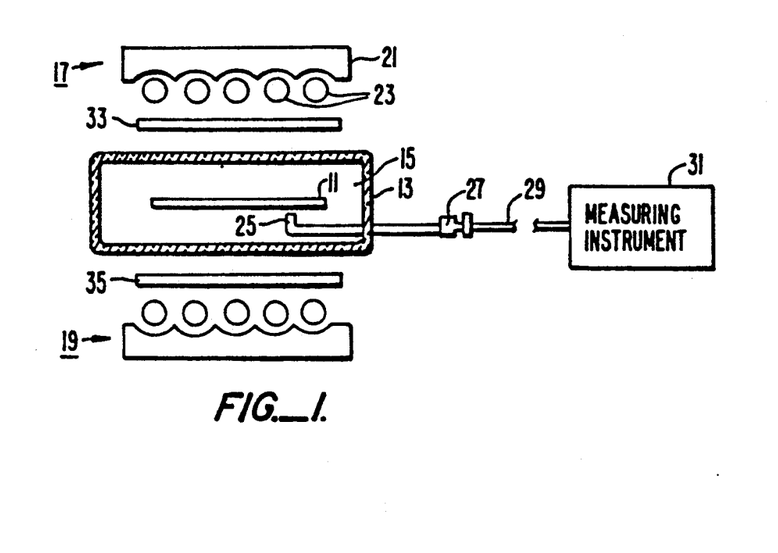
FIG. 1 illustrates one embodiment of the present invention according to a first aspect.

Although the embodiments of the invention to be described can be applied to the measurement of the temperature of almost any optically heated object, an example of heating a semiconductor wafer during integrated circuit processing is utilized since this is an important application. Referring to FIG. 1, such a semiconductor wafer 11 is schematically shown to be enclosed within a quartz furnace or processing chamber 13. Mechanical supports for the wafer 11 (also referred to herein as "object"), sources of processing gases into a chamber 15 in which the wafer 11 is positioned, and other equipment required for processing are omitted for simplicity.

The wafer 11 is heated by banks 17 and 19 of lamps positioned, in one example, on opposite sides of the wafer 11. Each bank of lights includes a reflector 21 and plurality of quartz lamps 23, for example, in the light bank 17. In order to measure the temperature of the wafer 11, a portion of its temperature-dependent emission is gathered by a bent lightpipe 25 that is able to withstand the temperatures within and near the quartz enclosure 13. At a suitable distance from that enclosure, the lightpipe 25 is connected by a coupler 27 to a suitable optical fiber 29. The optical fiber 29 carries the emission signal to a measuring instrument 31, where it is detected, electronically processed, and correlated with temperature.

If the heating light bank 19 is not utilized, as is sometimes the case, or if a single more powerful lamp is used, the method is the same except for the specific geometry. Others have generally tended to measure the emission of the object 11 in an optical wavelength band that is outside of the emission band of the lamps 23, in order to avoid the effect of strong optical lamp noise. But the techniques of the present invention allow the measurement to take place in a wavelength band that is near the wavelength of the peak intensity of the lamp 23 and take advantage of the wavelength regions which have high sensitivity and good emissivity for pyrometric measurements.

Figure 3:
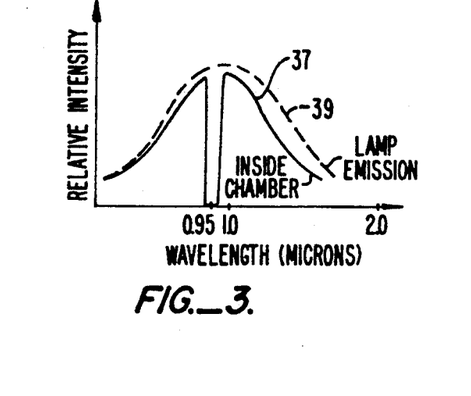

The embodiment of FIG. 1 allows this overlapping operation by the provision of highly tuned mirrors 33 and 35 positioned in front of each of the light banks 17 and 19, respectively. These mirrors are chosen to have a narrow, sharp reflection bandwidth centered around the photo-detector's wavelength sensitivity. A specific example of a "notch" in the lamp emission wavelengths caused by the mirrors is indicated by a curve 37 of FIG. 3. The emission wavelengths of the lamps are indicated by a curve 39. In this specific example, a silicon detector within the measuring instrument 31 is provided to monitor the emission from the object 11 at a very narrow wavelength around 0.95 microns. Thus, the mirrors 33 and 35 are each provided to reflect light from the lamps within a bandwidth, in this example, that is ±10 nanometers from the 0.95 micron center wavelength. Light within that bandwidth is not allowed to enter the chamber 15 from the lamps. By reflecting the light in this narrow band, rather than absorbing it, overheating of the mirrors 33 and 35 is avoided. The structure of each of these mirrors is preferably a multi-layered, mirror of a type used with high powered lasers.

Figure 2:
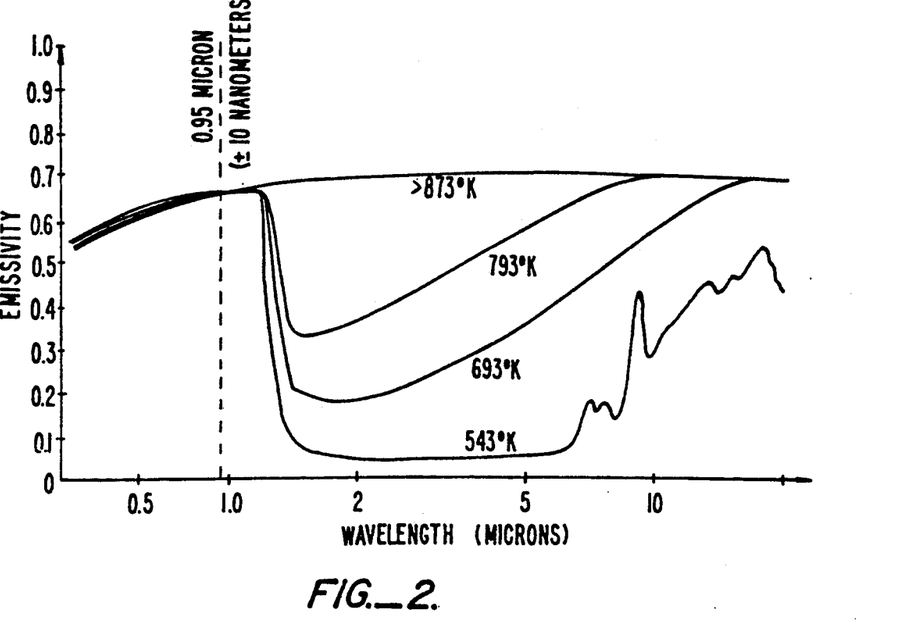
FIGS. 2 and 3 each show curves of operation of the embodiment of FIG. 1.

Referring to FIG. 2, an advantage of the present invention is illustrated by some example emissivity curves for pure silicon, similar to that of the semiconductor wafers 11 that are radiantly heated. The curves of FIG. 2 show an emissivity that varies significantly as a function of temperature in wavelengths longer than one micron. Measurements within this range are difficult to make because of the varying emissivity as a function of the object's temperature. Even so, others using pyrometric techniques for optically heated objects operate within a band around 4, 5 or more microns in order to avoid any overlap with the heating lamp spectra. However, this source of error is eliminated by the techniques of the present invention wherein the capability is provided for measuring temperature by monitoring the object's emission in a wavelength band shorter than one micron.

In a preferred implementation of the embodiment of FIG. 1, the lightpipe 25 is made of sapphire. Because of its refractive index, a sapphire lightpipe 25 has large numerical aperture (angle of acceptance) of radiation from the surface of the heated object 11. In addition to its good optical characteristics, sapphire is able to withstand the high temperatures within the chamber 15. Cubic zirconia also has these desirable characteristics. The measuring instrument 31 is preferably a commercially available model 100 of the Accufiber division of Luxtron Corporation, Beaverton, Oregon.

Figure 4:
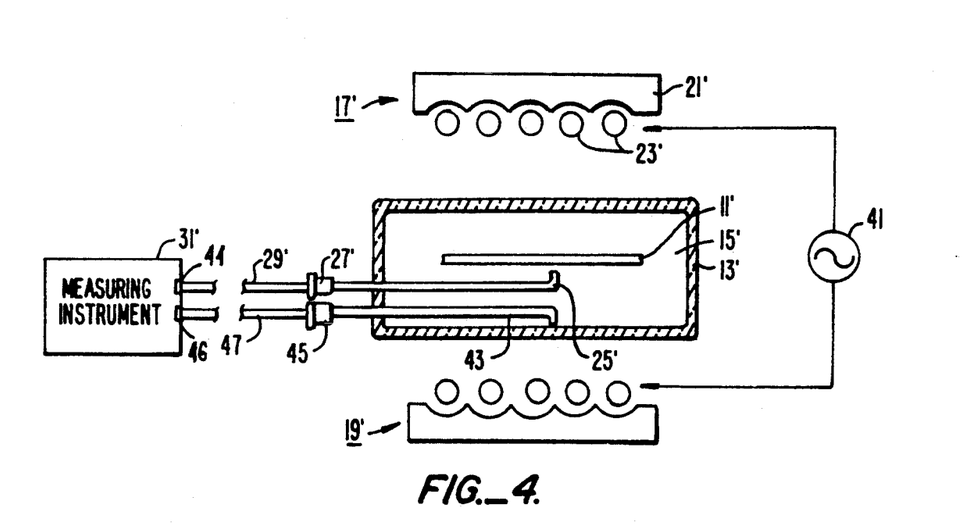
FIG. 4 illustrates one embodiment of the present invention according to a second aspect.

A second embodiment of the present invention is illustrated in FIG. 4. Structural elements of FIG. 4 that correspond to those of the embodiment of FIG. 1 are given the same reference number but with a prime (') added. An electrical power supply 41 is also indicated for driving the heating lamps of each of the light banks 17' and 19'. These lamps are driven with an alternating current at the power distribution line frequency, 60 Hz., for the United States, and 50 Hz. in Europe.

The embodiment of FIG. 4 provides no mirrors or optical filters between the light banks and the object 11' being heated. Therefore, the lightpipe 25' will receive a signal that is composed of both reflected lamp light and object emitted light. In this embodiment, the lamp output is measured without contribution of emission from the object 11' and a signal develops which is then subtracted from the signal from the lightpipe 25' in order to eliminate the effect of the source reflectance from that signal. A second lightpipe 43 is provided within the chamber 15' but faces downward toward the lamps of the light bank 19'. The optical signal in the lightpipe 43 is connected by a coupler 45 to a standard optical fiber 47. The light signals within the optical fibers 29' and 47 are detected by the same type of detectors within a measuring instrument 31', namely respective photodetectors 44 and 46. The electrical signal outputs of these detectors are then processed in a way to subtract the effect of the heating lamps out of the signal gathered by the lightpipe 25'. Alternatively, a single lightpipe and detector can be provided where the lightpipe is rotated between positions facing the object and the lamps.

Figure 5:
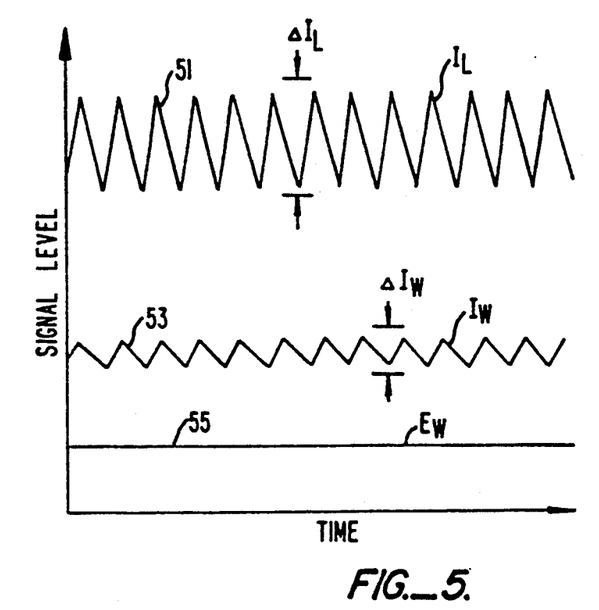
FIG. 5 are curves which show the operation of the embodiment of FIG. 4.

This processing is illustrated by the curves of FIG. 5. A curve 51 shows the signal level output of the detector receiving the optical signal of the lamps alone through the lightpipe 43. An a.c. component of the signal 51 results from an output of the banks 17' and 19' of lamps being modulated by the alternating current supply 41 driving them. Similarly, a curve 53 illustrates the output of the detector receiving the combined object emission and heating light source reflection received by the lightpipe 25'. The a.c. component (ripple) of the signal 51 is indicated by $\Delta I_L$, and the a.c. component of the signal 53 is denoted by $\Delta I_W$. The curves of FIG. 5 also show a steady state signal 55 that is proportional to the emission of the object 11' ($E_W$), which can be derived by processing within the instrument 31 of the signals 51 and 53.

Because the lightpipes 25' and 43 are selected to have a very large numerical aperture, the following relationship is true:

$$\text{Wafer Reflectivity} = \frac{\Delta I_W}{\Delta I_L} \qquad (1)$$

Since we also know that, under certain conditions, emissivity of an object equals one minus its reflectivity, we can state that:

$$\text{Emissivity} = 1 - \frac{\Delta I_W}{\Delta I_L} \quad (2)$$

Equation (2) provides a measurement of the emissivity of the object. If its temperature is to be measured, the reflected component of $I_W$ can then be subtracted away, leaving the object emission signal alone, as follows:

$$E_W = I_W - I_L\left(\frac{\Delta I_W}{\Delta I_L}\right) \quad (4)$$

Thus, the quantity $E_W$ is solely the object emission and thus can be converted into temperature of the object $11'$. $E_W$ is determined from processing of the d.c. level and a.c. level of the signals 51 and 53.

The system illustrated by FIGS. 4 and 5 operates well by itself, but can be modified to include insertion in front of the lamp bank $17'$ and $19'$ mirrors of the type described for mirrors 33 and 35 of FIG. 1. Such a configuration combines the advantages of both specific embodiments.

Figure 6:
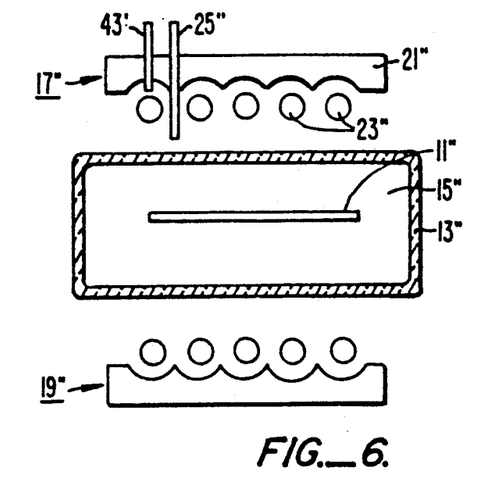
FIG. 6 shows a modification of the embodiment of FIGS. 4.

Referring to FIG. 6, a modification of the FIG. 4 embodiment is shown. Here, the lightpipes $25''$ and $43'$ are positioned outside of the enclosure $13''$.

Although the various aspects of the present invention have been described with respect to their preferred embodiments, it will be understood that the invention is entitled to protection within the full scope of the appended claims.

It is claimed:

1. A non-contact method of measuring a characteristic of a surface of an object being heated by electromagnetic radiation directed from at least one lamp against the object surface, comprising the steps of:

modulating at a given frequency an intensity of the heating radiation from said at least one lamp by driving said at least one lamp with an alternating current at said given frequency, determining a degree of modulation of said intensity of the heating radiation, detecting a combined level of electromagnetic radiation including a portion of radiation emitted from said object surface and a portion of said source radiation which has interacted with said object surface, thereby to obtain a first electrical signal corresponding to said detected combined level of electromagnetic radiation and having an amplitude component at said given frequency, and combining at least the first electrical signal and an electrical signal corresponding to the degree of heating radiation modulation in a manner to obtain said object surface characteristic.

2. The method according to claim 1 wherein said object is a semiconductor wafer being processed within a chamber.

3. The method according to claim 1 wherein the characteristic being measured includes an emissivity of said object surface.

4. The method according to claim 1 wherein the characteristic being measured includes a temperature of said object surface.

5. The method according to claim 1 wherein the step of determining the degree of modulation includes a step of detecting a level of the electromagnetic radiation that is being directed from said at least one lamp toward said object surface, thereby to obtain a second electrical signal corresponding to said detected level of the electromagnetic radiation that is being directed from said at least one lamp toward said object surface and having an amplitude component at said given frequency that is related to said degree of modulation.

6. The method according to claim 1 wherein the detecting step includes the steps of providing an optical light pipe to receive said combined level of radiation, and providing a light signal detector connected to said optical light pipe to receive a light signal generated by said optical light pipe in response to said received combined level of radiation.

7. The method according to claim 6 wherein the light pipe providing step includes the step of providing an optical light pipe made from either sapphire or cubic zirconia.

8. The method according to claim 6 wherein said object is confined within an enclosure having at least an optically transparent wall portion through which said object heating radiation is passed from said at least one lamp being positioned outside of said enclosure, wherein the light pipe providing step includes the step of providing a light pipe having one end positioned within the enclosure to receive said radiation and another end extending outside of said enclosure, and wherein the light signal detector providing step includes the step of providing a light signal detector connected to said light pipe end extending outside of said enclosure.

9. The method according to claim 6 wherein said object is confined within an enclosure having at least an optically transparent wall portion through which said object heating radiation is passed from said at least one lamp being positioned outside of said enclosure, and wherein the light pipe providing step includes the step of providing a light pipe outside of said enclosure, and wherein the light signal detector providing step includes the step of providing a light signal detector connected to said light pipe and positioned outside of said enclosure.

10. A system adapted to measure the temperature and/or emissivity of an article being heated within a chamber by electromagnetic radiation of a given bandwidth directed through a substantially optically transparent wall portion of the chamber against a surface area of said article from a radiation source positioned outside said chamber, comprising:

first and second photodetectors each characterized by generating an electrical signal proportional to the level of electromagnetic radiation incident upon it, means positioned with respect to the article for carrying to the first photodetector electromagnetic radiation including source electromagnetic radiation reflected from said article surface area and electromagnetic radiation emitted by said article surface area within the bandwidth of the source electromagnetic radiation, means positioned with respect to the source for carrying to the second photodetector source electromagnetic radiation substantially without any radiation reflected or emitted from said article surface, and means receiving and combining the electrical signals from the first and second photodetectors for determining the temperature and/or emissivity of the object surface.

11. The system according to claim 10 wherein both of said carrying means extend into said chamber and said first and second photodetectors are outside of said chamber.

12. The system according to claim 10 wherein said carrying means positioned with respect to the article is positioned outside of said chamber in the path of electromagnetic radiation reflected from and emitted by said article surface after passing through said optically transparent wall, and said carrying means positioned with respect to the source is also positioned outside of said chamber.

13. A method of measuring a characteristic of a surface of an object being heated by electromagnetic radiation directed from at least one radiation source against the surface of the object, comprising the steps of:
   detecting a first level of radiation substantially including radiation emitted from said heated object surface and radiation reflected off said heated object surface from said at least one radiation source,
   determining a level of radiation reflected off said heated object surface from said at least one radiation source,
   calculating a level of radiation emitted from said heated object surface by subtracting said determined level of radiation from said detected first level of radiation, and
   using the calculated level of radiation emitted from the heated object surface to obtain a measure of said surface characteristic.

14. The method according to claim 13 wherein said first level of radiation detecting step comprises the step of providing a light gathering apparatus having a wide numerical aperture positioned such that said light gathering apparatus captures light substantially including light emitted from said heated object surface and light reflected off said heated object surface from said at least one radiation source.

15. The method according to claim 13 wherein said first level of radiation detecting step comprises the step of providing a first light pipe positioned such that said first light pipe captures radiation substantially including radiation emitted from said heated object surface and radiation reflected off said heated object surface from said at least one radiation source.

16. The method according to claim 13 wherein said determining step comprises the step of: detecting a second level of radiation substantially including radiation originating from said at least one radiation source, but substantially not including radiation emitted from said heated object surface or radiation reflected off said heated object surface from said at least one radiation source.

17. The method according to claim 16 wherein said first level of radiation detecting step comprises the step of providing a light gathering apparatus having a wide numerical aperture positioned such that said light gathering apparatus captures light substantially including light emitted from said heated object surface and light reflected off said heated object surface from said at least one radiation source.

18. The method according to claim 17 wherein said second level of radiation detecting step comprises the step of providing a second light gathering apparatus having a wide numerical aperture positioned such that said light gathering apparatus captures said second level of radiation substantially including radiation originating from said at least one radiation source, but substantially not including radiation emitted from said heated object surface or radiation reflected off said heated object surface from said at least one radiation source, wherein said wide numerical apertures of said first and second light gathering apparatuses are selected so as to enhance the determination of said surface characteristic.

19. The method according to claim 17 wherein said calculating step comprises the steps of:
   generating a first electrical signal corresponding to said detected first level of radiation,
   generating a second electrical signal corresponding to said detected level of radiation,
   generating a third electrical signal corresponding to said level of radiation for radiation emitted from said heated object by logically combining said first and second electrical signals.

20. A non-contact method of determining an attribute of a surface of an object being heated by directing thereagainst a source of heating radiation having a time varying intensity, comprising the steps of:
   detecting as a first signal a combination of a portion of said heating radiation that is reflected from the object surface and radiation being emitted by said object surface,
   determining as a second signal a level of the incident heating radiation that is being directed against said object surface from said source,
   determining a characteristic of a time varying component of each of said first and second signals that is the result of said heating radiation time varying component, and
   combining at least the time varying component characteristic of said first and second signals in a manner to obtain said object surface attribute.

21. The method according to claim 20 wherein the surface attribute being determined is its emissivity.

22. The method according to claim 20 wherein the surface attribute being determined is its temperature.

23. The method according to claim 20 wherein the characteristic determining step includes determining a magnitude of the time varying component of each of said first and second signals that is the result of said heating radiation time varying component.

24. The method according to claim 20 wherein the object includes a semiconductor wafer.

25. The method according to claim 20 wherein the object is contained in a chamber having a substantially transparent wall through which the heating radiation is passed from outside of the chamber.

26. The method according to claim 25 wherein the step of detecting the first signal includes positioning an end of a light pipe within the chamber and arranged to collect a portion of the radiation from the object surface.

27. The method according to claim 26 wherein the light pipe used to collect a portion of the radiation from the object surface is either sapphire or cubic zirconia material.

28. The method according to claim 26 wherein the step of detecting the first signal additionally includes extending the light pipe out of the chamber in order to direct the portion of the reflected heating radiation onto a photodetector.

29. The method according to claim 26 wherein the step of detecting the second signal includes positioning an end of a second light pipe within the chamber between the transparent wall and the object and in a manner to collect a portion of the heating radiation being directed through the transparent wall.

30. The method according to claim 29 wherein the second light pipe used to collect a portion of the heating radiation being directed through the transparent wall is either sapphire or cubic zirconia material.

31. The method according to claim 29 wherein the step of detecting the first signal additionally includes extending the light pipe out of the chamber in order to direct the portion of the heating radiation onto a photodetector.

* * * * *

UNITED STATES PATENT AND TRADEMARK OFFICE
CERTIFICATE OF CORRECTION

PATENT NO. : 5,318,362

DATED : June 7, 1994

Page 1 of 2

INVENTOR(S) : Charles W. Schietinger; Bruce E. Adams

It is certified that error appears in the above-indentified patent and that said Letters Patent is hereby corrected as shown below:

In Column 7, line 51 in Claim 16:
  replace "determining step comprises the step of: detecting a sec-" with:

--determining step comprises the step of detecting a sec- --

In Column 8, line 11 in Claim 19:
  replace "19. The method according to claim 17 wherein said" with:

--19. The method according to claim 13 wherein said--

In Column 8, line 16 in Claim 19
  replace "to said detected level of radiation," with --to said determined level of radiation, and--

UNITED STATES PATENT AND TRADEMARK OFFICE
CERTIFICATE OF CORRECTION

PATENT NO. : 5,318,362
DATED : June 7, 1994
INVENTOR(S) : Charles W. Schietinger; Bruce E. Adams It is certified that error appears in the above-indentified patent and that said Letters Patent is hereby corrected as shown below:

In Column 8, Line 30 in Claim 20
   replace "determining as a second signal a level of the incident" with    --detecting as a second signal a level of the incident--

In Column 8, Line 38 in Claim 20
   replace "acteristic of said first and second signals in a man-" with    --acteristics of said first and second signals in a man- --

Signed and Sealed this

Eighth Day of August, 1995

Attest:

BRUCE LEHMAN

Attesting Officer      Commissioner of Patents and Trademarks